Aug. 19, 1958 K. J. AVERSTEN 2,848,594
SOLDERING PIN AND THE LIKE WITH TWO
OR MORE SOLDERING SETS
Filed Oct. 5, 1954
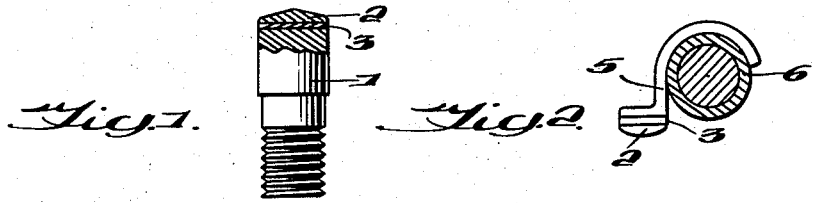
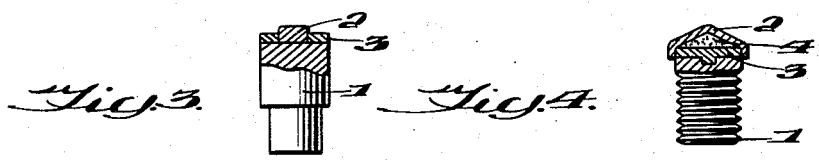
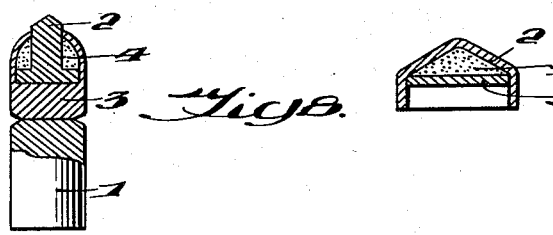
INVENTOR
KARL JOEL AVERSTEN,
BY Robert B Larson
ATTORNEY

2,848,594

SOLDERING PIN AND THE LIKE WITH TWO OR MORE SOLDERING SETS

Karl J. Aversten, Lidingo, Sweden, assignor to Svenska Aktiebolaget Gasaccumulator, Lidingo (near Stockholm), Sweden, a corporation of Sweden Application October 5, 1954, Serial No. 460,486

Claims priority, application Sweden July 3, 1954

1 Claim. (Cl. 219—99)

The present invention refers to such soldering pins and the like which are at their one end provided with a soldering metal, intended to be fused by means of an electric arc, produced between the soldering metal and a metallic bed, and to connect the soldering pin to the bed after solidification. In order to get a good binding between the soldering metal and the base material of the bed, the base material must be adequately heated at the soldering spot in question. This demand has hitherto been fulfilled because a considerable quantity of soldering metal has been fused in the arc in order to obtain the required heating of the base material. Thus, the problem has been to make the arc give the base material the necessary degree of heating without having to fuse too great a quantity of valuable soldering metal.

This problem has been solved according to the invention by providing one end of the soldering pin with two or more soldering metals or alloys of soldering metals, intended to be fused in arc and having rather different fusing points. The end of the soldering pin is for instance provided with a small front part of a not-so-difficultly fusible silver solder alloy and behind this alloy a considerably-more-difficultly fusible soldering metal, preferably copper. The silver solder alloy, having the lower fusing point, fuses first, but then greater heat is required for fusing the more-difficultly fusible soldering metal, the copper, i. e. the fusion time is prolonged, resulting in greater heating of the working piece per quantity of fused soldering metal. Thus, one gets a fusion-delaying effect with the desired increased heating of the base material as a consequence.

This fusion-delaying effect is especially worth striving for when using comparatively expensive, silver-alloyed soldering metals. Silver is an especially useful metal for obtaining good arc soldering. For economic reasons it is, however, necessary to save this metal as much as possible. Especially in the type of arc soldering described in Patent No. 2,711,915 the total silver quantity has hitherto not been determined from the quantity of soldering metal necessary for filling the joint, but from the quantity of heat necessary for heating the thick rail, which rapidly conducts away the heat, and for heating the contact shoe.

By using two or more soldering sets on the pin, each of which is to be fused in the arc, a better fusion delay is obtained than if the soldering sets were fused together before being applied on the pin, as such a fused alloy would have a lower fusing point than the fusing point of each of the soldering sets. Thus, also the use of a pure metal in the several soldering sets gives a better fusion-delaying effect than the use of alloys.

From a practical point of view, however, alloys may in certain cases be preferable. Such metals as for instance zinc and cadmium provide a soldering connection that is good in itself, but they have because of their low-fusing points an unfavorable effect on the fusion delay. The zinc should therefore be alloyed with copper and the result improves the higher the percentage of copper is.

Iron would also have a fusion-delaying effect, but is out of question, as even a very small fusion of iron results in a disastrous deterioration of the strength of the soldering connection. In the cases when the pin itself is of iron or steel, it is thus necessary to prevent a fusion of the part of the pin situated next to the soldering sets. The fusion-delaying effect, attainable by means of the invention, considerably increases the possibility that said fusion of the pin material will be avoided, and the invention thus provides an additional means of protection.

Practically the soldering sets on the pin may be applied in many different ways, for instance situated one after the other, concentrically, radially, interlocking etc. Some of these ways are shown on the attached drawings.

Fig. 1 shows an elevation of a soldering pin, made according to the invention.

Fig. 2 shows a side view of a cable clamp, executed according to the invention, the cable being shown in cross section.

Figs. 3–7 correspond to Fig. 1, but show various embodiments of soldering pins according to the invention.

Fig. 8 shows an axial section of a separate end piece to be applied on a metal pin or the like.

Fig. 1 shows a soldering pin 1 of metal, such as iron, steel, copper, brass etc. with a soldering set 2 of a not-so-difficultyl fusible soldering metal or soldering metal alloy, such as silver solder, harder silver solder, welding bronze, etc., and a soldering set 3 of a more-difficultly fusible soldering metal or soldering metal alloy, such as copper, brass.

When this pin 1—3 has been inserted into a current-supply tool, such as a welding gun, and is held against the smooth metal surface, where the pin 1 is to be fastened, the arc, appearing between the pin and the metal surface, first fuses the more fusible soldering set 2 and then the more-difficultly fusible soldering set 3, serving as fusion-delaying means for obtaining the desired heating of the metal surface at the soldering spot. The soldering sets 2 and 3 form at the fuse a soldering metal alloy with good strength for keeping the pin 1 against the metal surface.

Fig. 2 shows a metal clip 5 with the soldering sets 2 and 3 with different fusing points and intended to fasten the metal clip 5 to a smooth metal surface, by fusion of these soldering sets in arc against such surface and by the succeeding solidification of the fused soldering sets, for the purpose of attaching to such surface an electric cable 6, a tube or the like.

Fig. 3 shows the more-difficultly fusible soldering set 3 applied as a ring around the other soldering set 2.

Fig. 4 shows the pin 1 with the soldering sets 2, 3 and a flux 4, enclosed by these sets, for purification of the fuse and the surrounding metal.

Figs. 5–7 show various mutual placings of the soldering sets 2 and 3 and the flux 4 on the pin 1.

Fig. 8 shows the soldering sets 2 and 3 as a separate piece, which can be squeezed over the end of a metal pin and is suitably transported separately to the working place and is fixed over the end of a pin only immediately before the soldering is to take place.

The not-so-difficultly fusible soldering set 2 may in percent by weight consist of: Ag 45%, Cu 19%, Zn 16% and Cd 20%, the fusing point of which alloy is about 620° C. The second soldering set 3 may consist of essentially pure Cu with a fusing point of about 1050° C. In addition to these soldering sets other soldering sets may be present on the same pin, for instance one soldering set with the fusing point about 700° C. and one soldering set with the fusing point about 900° C. The arrangement with two or more soldering sets according to the invention may be used for a number of different connection elements, such as studs, screw spindles, pegs, tube nipples, hooks, etc.

What is claimed is:

A soldering pin comprising a main metal part and an end contact part, said end contact part comprising at least two soldering metals in discrete formations, said soldering metals having different melting points, both of said soldering metals having lower metal points than that of said main metal part, at least one of said melting points of soldering metals being sufficiently high to provide a fusion-delaying effect to insure effective heating of the member to which the pin is soldered, said discrete formations of soldering metals being disposed on one end of the main metal part with the soldering metal having the higher point more closely adjacent the main metal part.

References Cited in the file of this patent

UNITED STATES PATENTS

| Re. 22,411 | Nelson | Dec. 21, 1943 |
| 2,068,639 | Alsaker et al. | Jan. 26, 1937 |
| 2,402,659 | Nelson | June 25, 1946 |
| 2,413,370 | Palmer | Dec. 31, 1946 |
| 2,506,747 | Smith | May 9, 1950 |
| 2,584,491 | Nelson | Feb. 5, 1952 |
| 2,711,798 | Aversten | June 28, 1955 |

FOREIGN PATENTS

| 715,259 | Great Britain | Sept. 8, 1954 |
| 1,059,383 | France | Nov. 10, 1953 |